US010968611B2

(12) United States Patent
Cortez

(10) Patent No.: US 10,968,611 B2
(45) Date of Patent: Apr. 6, 2021

(54) WATER DIVERSION ASSEMBLY

(71) Applicant: Anthony James Cortez, San Mateo, CA (US)

(72) Inventor: Anthony James Cortez, San Mateo, CA (US)

( * ) Notice: Subject to any disclaimer, the term of this patent is extended or adjusted under 35 U.S.C. 154(b) by 139 days.

(21) Appl. No.: 16/433,913

(22) Filed: Jun. 6, 2019

(65) Prior Publication Data

US 2019/0382988 A1 Dec. 19, 2019

Related U.S. Application Data

(60) Provisional application No. 62/684,566, filed on Jun. 13, 2018.

(51) Int. Cl.
*E03C 1/02* (2006.01)
*F04F 10/00* (2006.01)
*F16K 31/00* (2006.01)
*E03B 1/04* (2006.01)

(52) U.S. Cl.
CPC ............. *E03C 1/023* (2013.01); *E03B 1/048* (2013.01); *F04F 10/00* (2013.01); *F16K 31/002* (2013.01); *E03C 2001/026* (2013.01); *E03C 2201/30* (2013.01); *Y10T 137/6497* (2015.04); *Y10T 137/7737* (2015.04)

(58) Field of Classification Search
CPC .... E03C 1/023; E03C 2201/30; E03C 1/0408; F16K 31/002; Y10T 137/6497; Y10T 137/7737; F04F 10/00; Y02A 20/411
See application file for complete search history.

(56) References Cited

U.S. PATENT DOCUMENTS

| | | | | | |
|---|---|---|---|---|---|
| 2,475,540 | A | * | 7/1949 | Birchfield | G05D 23/1346 236/12.16 |
| 6,098,213 | A | * | 8/2000 | Chu | E03B 1/042 4/597 |
| 6,299,071 | B1 | * | 10/2001 | Fiedrich | F24D 19/1015 237/70 |
| 2008/0128521 | A1 | * | 6/2008 | Squire | E03B 1/048 236/12.11 |
| 2013/0175350 | A1 | * | 7/2013 | Marks | E03C 1/04 236/12.12 |
| 2019/0353267 | A1 | * | 11/2019 | Pfund | F16K 19/006 |

* cited by examiner

*Primary Examiner* — Atif H Chaudry
(74) *Attorney, Agent, or Firm* — John Eide; Christopher Pilling; My Patent Guys

(57) ABSTRACT

The water diversion assembly of the present invention herein diverts and preserves the water supply when water supply is currently below the threshold temperature. The present invention relates to a water diversion assembly having a hot water inlet connected to a hot water supply and a cold water inlet connected to a cold water supply. An appliance outlet, for use by the user of an appliance, is configured to connect and deliver a water mix at an outlet temperature. The appliance outlet is in fluid communication with the hot water inlet, the cold water inlet, and a water collection outlet. Within the water diversion assembly, a thermostatic diversion valve having a hot water threshold temperature setting and arranged such that water from the hot water supply via the hot water inlet is delivered to the water collection outlet until the hot water threshold temperature is reached and then thermostatically diverted to a thermostatic mixing valve.

15 Claims, 12 Drawing Sheets

WATER DIVERSION ASSEMBLY

RELATED APPLICATION

The present application is a continuation application to U.S. Provisional Application Ser. No. 62/684,566, filed on Jun. 13, 2018, the disclosure of which is hereby incorporated in its entirety at least by reference.

BACKGROUND

1. Field of the Invention

The present invention relates to a water diversion assembly for diverting water to be used at a later time.

2. Description of Related Art

Common household systems connected to water supplies such as showers, sinks, dishwashers, and washing machines waste potable water upon initial startup or during a time period wherein a user is waiting for the water supply to reach a desired characteristic. These desired characteristics can vary with different common household systems, but commonly include the temperature of the water supply. Since the water temperature is critical to achieving a desired function by the user, water is commonly wasted down a drain while the user waits until the water supply from a water heater or from a plumbing pipe is above the user desired water temperature. For example, while the user is waiting for the water emitted by a shower head to reach a desired water temperature the water emitted is simply allowed to enter a drain, consequentially wasting the potable water.

Secondly, in many common household systems, there are no clean methods or methods for capturing and retaining wasted potable water discarded before a specific temperature is reached. Common methods are often messy and include open top containers such as buckets to catch only a portion is the initial potable water wasted during start-up.

A solution is needed for optimally diverting water that is typically wasted while the water temperature is increasing to the desired water temperature and collecting this water while the water is below the desired water temperature in a modular reservoir or directing the water for secondary use.

SUMMARY

The present invention relates to a water diversion assembly for addressing the problems presented above. The water diversion assembly preserves a water supply that is normally wasted or disregarded by the user before being used for an intended purpose. The water diversion assembly diverts and preserves the water supply when the water supply is currently below the threshold temperature.

Another object of the present invention is to provide the user manual control of a threshold temperature.

Another object of the present invention is to provide an assembly that is essentially mechanical in nature and does not require electrical power, batteries or electrical subcomponents to accomplish the diversion of the water supply.

It is yet another object of the present invention to provide a convenience, comfort and a utility saving solution. Comfort is provided as the potential of water temperature shock is eliminated in certain embodiments.

The user may mount the water diversion assembly in a permanent configuration as a component working in fluid connection with a variety of household appliances, a cold water outlet or a hot water outlet. Alternatively, the water diversion assembly may comprise a modular configuration to be adapted to be used with a household appliance after the household appliance has been previously installed. A purpose of the present invention is to provide modular storage of the water supply diverted by the water diversion assembly for later use by the user. For example, a reservoir that is portable, lightweight and detachable for use in another location.

The water diversion assembly may also be used in conjunction and in fluid connection with other appliances, such as toilets, to directly re-use the water supply diverted by the water diversion assembly to fill the toilet tank.

Another object of the present invention is to provide a water diversion assembly additionally having a priming unit, in some embodiments, that can be manually engaged by the user to prime a fourth conduit. In doing so, a reservoir downstream of the water collection outlet can be utilized by appliances even when no water has previously been diverted and stored within the fourth conduit. In doing so, the water in the reservoir can be directly utilized by appliances downstream of the fourth conduit.

In order to do so, a water diversion assembly is provided having a hot water inlet connected to a hot water supply and a cold water inlet connected to a cold water supply. An appliance outlet, for use by the user of an appliance, is configured to connect and deliver a water mix at an outlet temperature. The appliance outlet is in fluid communication with the hot water inlet and the cold water inlet and a water collection outlet. Within the water diversion assembly, a thermostatic diversion valve is arranged such that water from the hot water supply via the hot water inlet is directed to the water collection outlet until a hot water threshold temperature is reached. When a hot water threshold temperature is reached, the water is subsequently then directed to a thermostatic mixing valve that further allows the user to adjust and configure the outlet temperature of the water mix to a predetermined temperature. In some embodiments, a series of conduits are used to initiate water flow between the water diversion assembly and an appliance.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Figure 1:
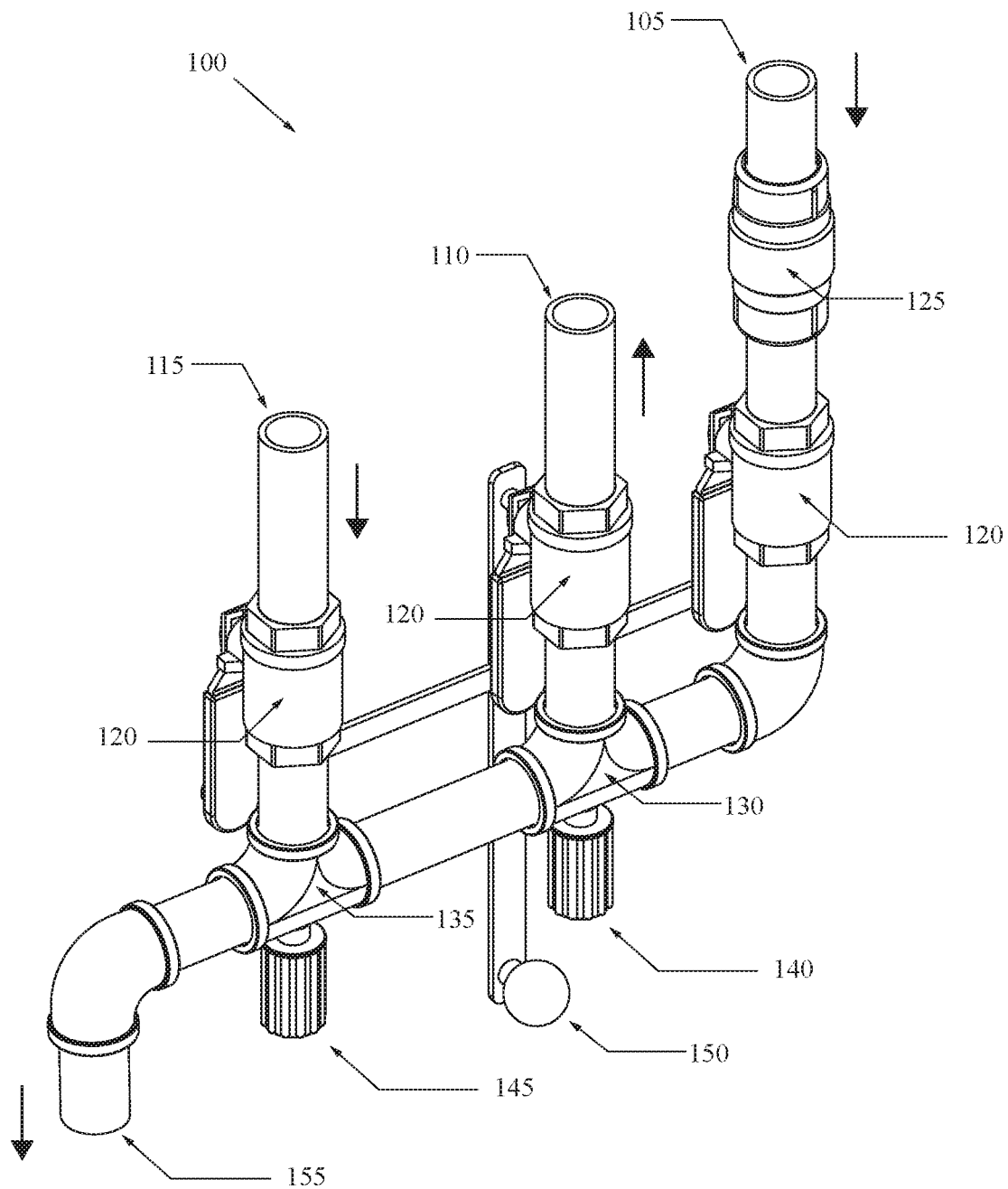
FIG. 1 shows an exemplary perspective view of one embodiment of the water diversion assembly.
Figure 2:
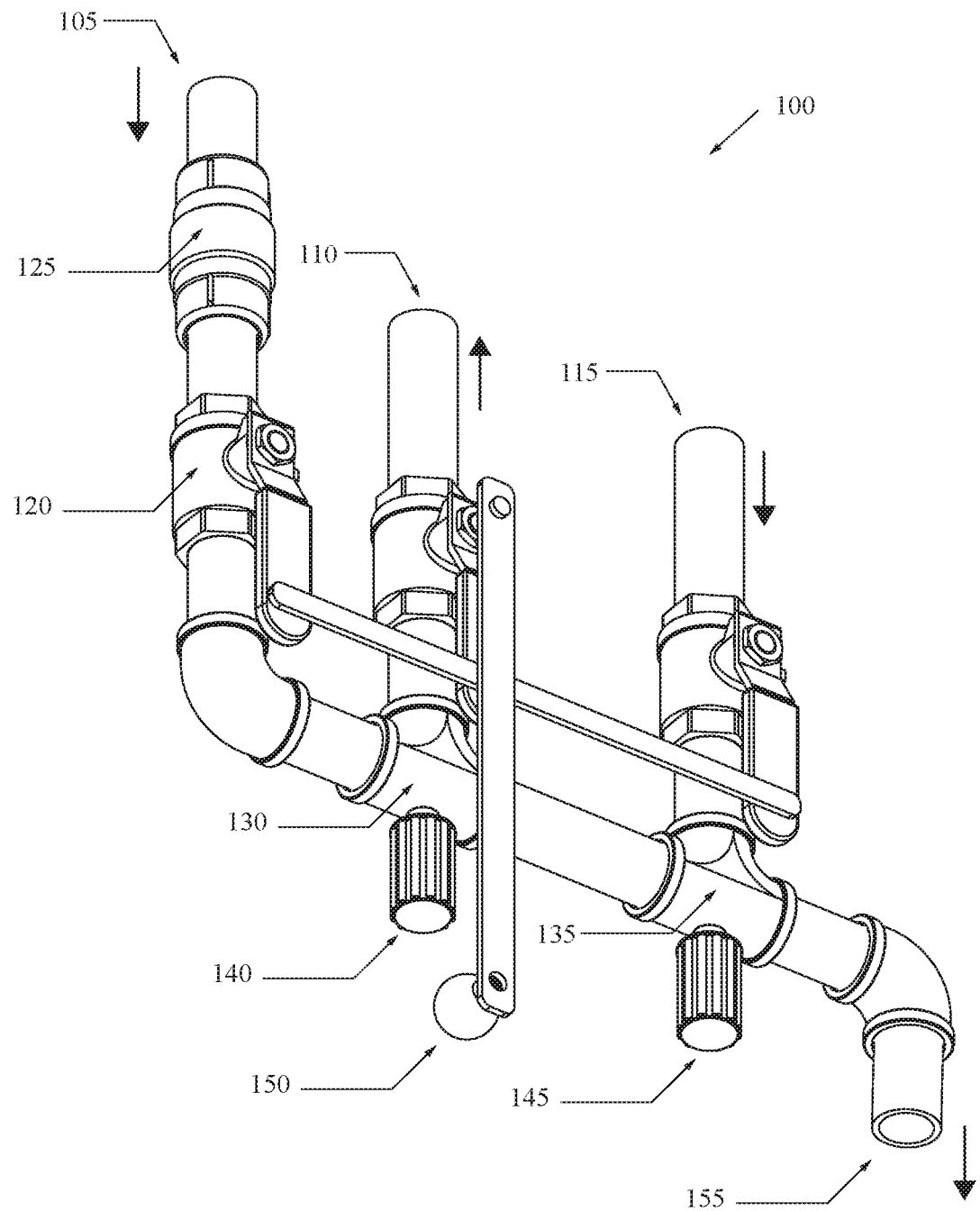
FIG. 2 shows an exemplary perspective view of one embodiment of the water diversion assembly.
Figure 3:
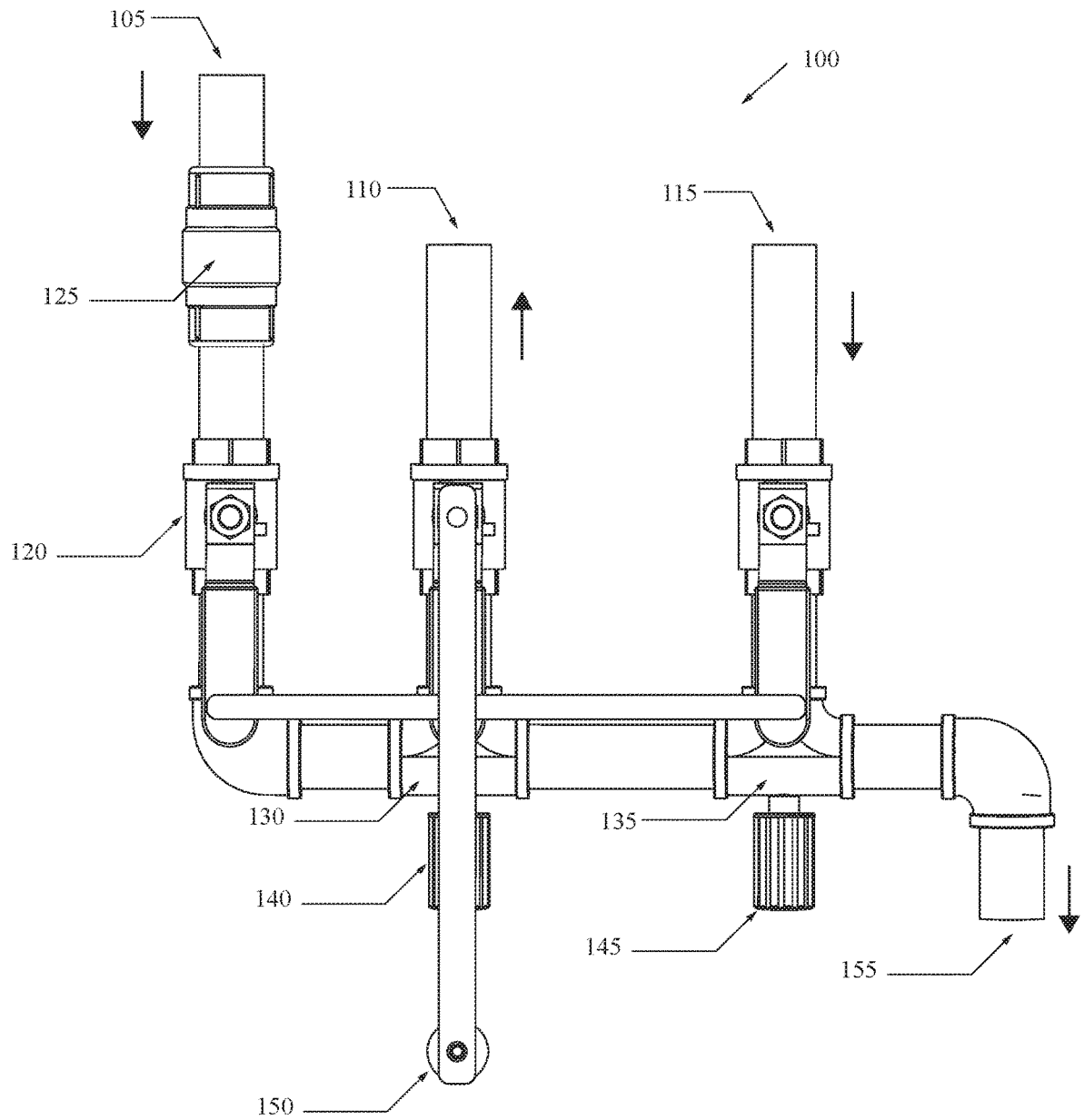
FIG. 3 shows an exemplary rear view of one embodiment of the water diversion assembly.

As shown in FIGS. 1-3, a water diversion assembly 100 is shown having a hot water inlet 115 configured to connect to a hot water supply and a cold water inlet 105 configured to connect to a cold water supply. In some embodiments, the cold water supply is from a toilet water supply line 210 (shown in FIG. 12) and the hot water supply is from a water heater. In alternative embodiments, the cold water supply is any cold water supply line.

Next, an appliance outlet 110 is configured to connect and deliver a water mix at an outlet temperature. At a downstream end of the water diversion assembly 100, the appliance outlet 110 is in fluid communication with the hot water inlet 115, the cold water inlet 105, and a water collection outlet 155. Diversion of the hot water supply is controlled by a thermostatic diversion valve 135 having a hot water a threshold temperature. The thermostatic diversion valve 135 is arranged such that water from the hot water supply supplied to the hot water inlet 115 is diverted until the hot water threshold temperature is reached.

In some embodiments, a thermostatic mixing valve 130 is arranged between the cold water inlet 105 and the hot water inlet 115, wherein the thermostatic mixing valve 130 is configured to automatically regulate the water mix such that the outlet temperature is at a predetermined temperature. In the preferred embodiment, the appliance outlet 110 is a shower head 165 (shown in FIGS. 5-7), wherein the water mix is emitted from the shower head 165. For example, the thermostatic mixing valve 130 in the preferred embodiment controls the predetermined temperature of the water mix emitted from the shower head 165. As one skilled in the art will recognize, the water diversion assembly 100 can be used in conjunction with multiple different appliances found in household and commercial environments by connecting to the appliance outlet 110 or the water collection outlet 155. By way of non-limiting example, exemplary embodiments of an appliance may include a hose, a sink, a faucet, a water filtration device, a dishwasher, a laundry machine, a shower, a toilet, an irrigation system, at least one water reservoir 160, and any combination thereof.

The water diversion assembly 100 may further comprise at least one temperature control element that is adjustable by the user. The thermostatic diversion valve 135 can further include a first manual temperature control element 145 configured to control the hot water threshold temperature, wherein the first manual temperature control element 145 is adjustable by the user. The thermostatic mixing valve 130 of the water diversion assembly 100 can further include a second manual temperature control element 140 configured to control the outlet temperature, wherein the second manual temperature control element 140 is adjustable by the user. Components of the water diversion assembly 100 can include an external texture to grip a hand of a human. In an exemplary manner, the external texture further comprises at least one member of a texture set consisting of: indentations, extrusions, knurling, a rough surface, and bumps. For example, the first manual temperature control element 145 and/or the second manual temperature control element 140 can comprise the external texture aiding the user in selecting or adjusting the outlet temperature or the hot water threshold temperature.

As shown in FIGS. 1-3, the water diversion assembly can include at least one directional supply valve 120. The at least one directional supply valve 120 configured to control the passage of the hot water supply, the cold water supply, and the water mix. In some embodiments, the at least one directional supply valve 120 may be operated by a supply lever 150. In some embodiments, wherein the at least one directional supply valve 120 further includes the supply lever 150, the supply lever 150 is to be manually engaged by the user to close or to open the hot water supply, the cold water supply, and the appliance outlet 110, simultaneously. Similarly, by way of example, the supply lever may also manually turn off or turn on at least one of the hot water supply, the cold water supply, and the appliance outlet independently.

Furthermore, at least one check valve 125 is used in conjunction with the water diversion assembly is provided. The at least one check valve 125 directionally controlling the flow of any inlet or any outlet of the water diversion assembly 100. In the preferred embodiment, the cold water supply and the cold water inlet 105 is accompanied by at least one check valve 125 allowing only the cold water supply into the water diversion assembly 100 and not allowing water to flow in the opposite direction and blocking water from within the water diversion assembly 100 from exiting back through the cold water inlet 105.

Within different embodiments configured to be used with different exemplary appliances, the water diversion assembly can include at least one conduit facilitating the transfer of the water collection outlet 155 to a secondary location or to the appliance (such as the water reservoir 160), the cold water supply to the cold water inlet 105, and/or the hot water supply to the hot water inlet 115.

Figure 4:
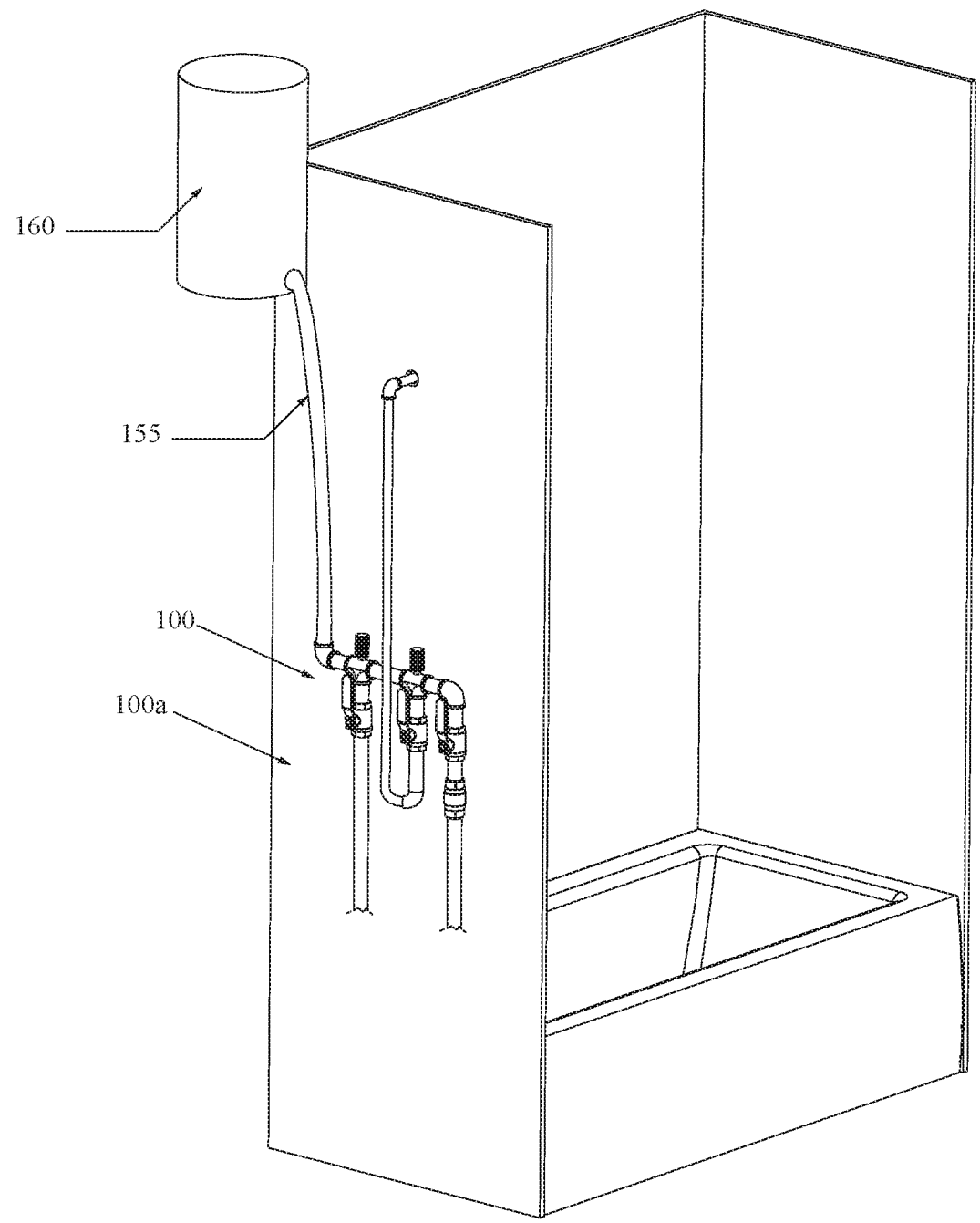
FIG. 4 shows an exemplary perspective view of one embodiment of the water diversion assembly configured to be used with an exemplary shower.
Figure 5:
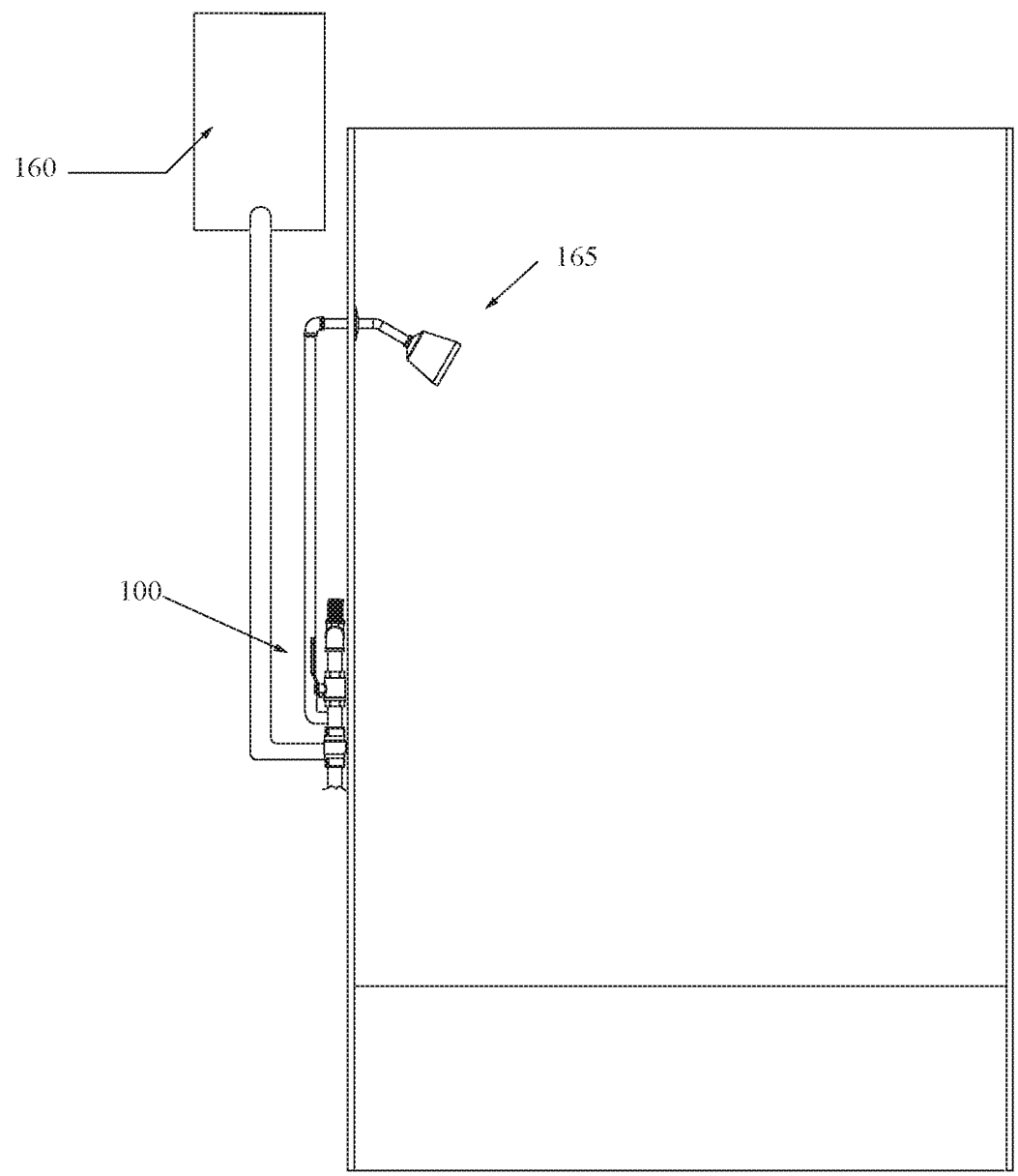
FIG. 5 shows an exemplary right view of one embodiment of the water diversion assembly configured to be used with an exemplary shower.

Referring now to FIGS. 4-5, the user may mount the water diversion assembly 100 in a permanent configuration 100a as a component working in fluid connection with existing plumbing or new plumbing during construction. The permanent configuration 110a can be installed within a wall or outside of a structure and/or building. In the preferred embodiment, the water diversion assembly 100 is installed behind a shower wall. Alternatively, the water diversion assembly 100 may comprise a modular configuration 100b to be adapted to be used with a household appliance after the appliance has been already been previously installed or mounted to a surface.

Figure 12:
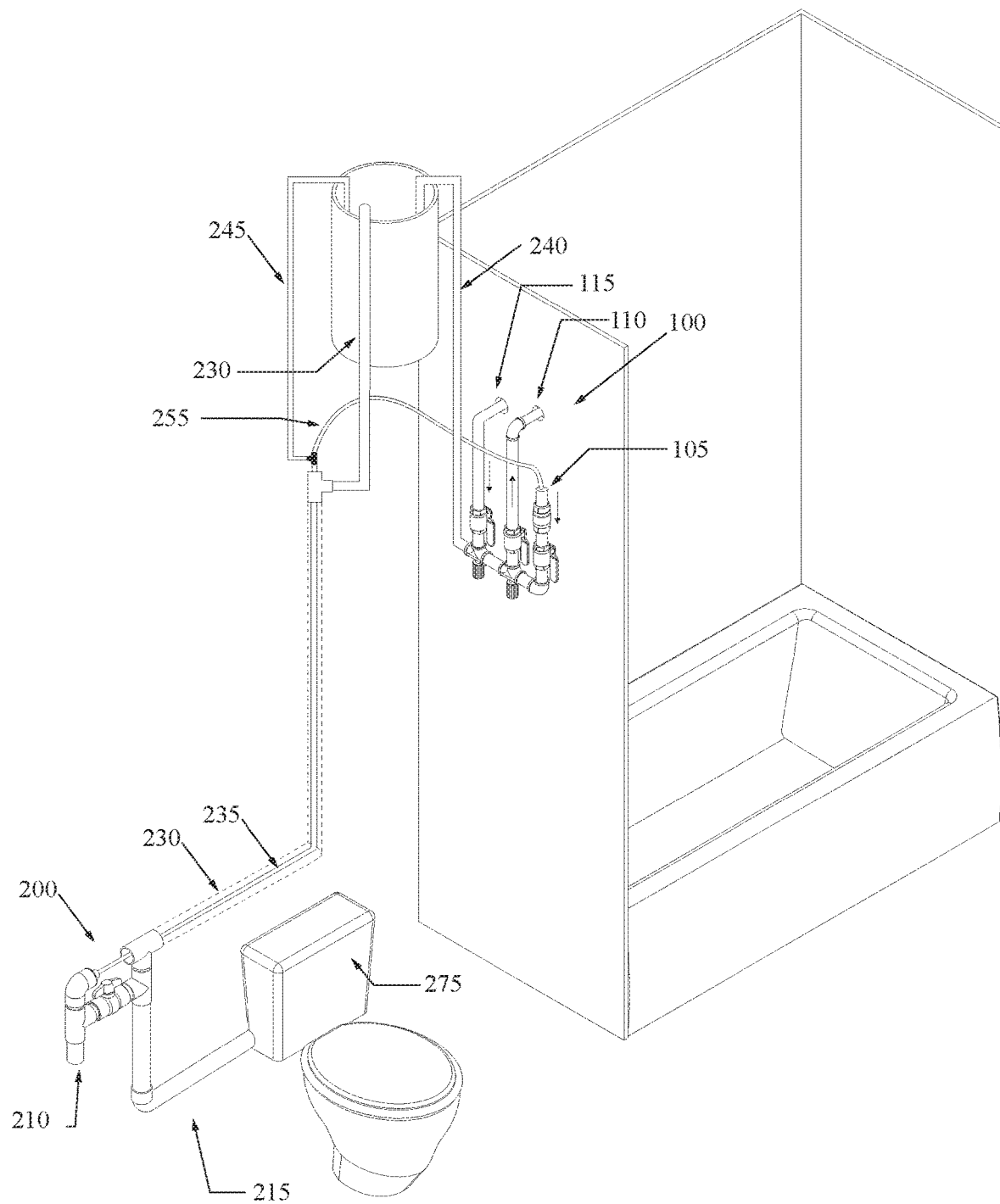
FIG. 12 shows an exemplary perspective view of one embodiment of the water diversion assembly configured to be used with an exemplary shower and with an exemplary toilet.

Referring now to FIG. 12, in the preferred embodiment, a first conduit 235 is in fluid communication with the cold water supply. Next, a second conduit 245 is in fluid communication with the first conduit 235 and the water reservoir 160. A third conduit 255 is then in fluid communication with the first conduit 235 and the cold water inlet 105. A fourth conduit 230 is positioned within the water reservoir 160 and facilitates a fluid connection between the water reservoir 160 and a toilet tank 275. Next, a siphon is utilized within the fourth conduit 230 to move the water from the water reservoir 160 to the toilet tank 275. In alternative embodiments, the siphon is not created, and water is moved by only a gravity feed only. Continuing to describe the preferred embodiment, the cold water supply is from a toilet water supply line 210 and the fourth conduit 230 facilitates a fluid connection between the water reservoir 160 and a toilet tank 275. A toilet tank supply line 215 may further be arranged downstream of the fourth conduit 230. A fifth conduit 240 facilitates the water collection outlet 155 to dispense water diverted by the water diversion assembly 100 to the water reservoir 160. In doing so, the water from the water reservoir 160 is used to fill the toilet tank 275 as the siphon is created by gravity after a toilet flush. In other embodiments, the toilet tank is filled with the water stored in the reservoir, via the gravity feed. In some embodiments, the toilet tank supply line 215 is positioned on a bottom side of the toilet tank 275. In some exemplary configurations, the first conduit 235 is positioned within a portion of the fourth conduit 230. In one embodiment, the first conduit 235 is a ¼" Pex conduit and the fourth conduit 230 is a ½"-1" PVC conduit. It should be understood that the size and material of the conduits may vary without departing from the spirit and scope of the invention. It should also be understood, that the embodiment described above is for retrofitting existing plumping assemblies. In other assemblies, the water diversion assembly 100 can be configured differently during new construction processes.

In some embodiments, the second conduit 245 can be connected to a float water level control valve within the water reservoir 160 and positioned to maintain a predetermined level within the water reservoir 160. The float water level control valve serving as a measure of precaution, to allow for the cold water supply to be sufficient enough to refill the water reservoir 160 to the predetermined level in an event that the water reservoir 160 is depleted below to the predetermined level. In the event wherein the water reservoir 160 and the fourth conduit 230 are depleted below the predetermined level, a priming operation is needed to re-initiate the siphon within the fourth conduit 230.

Figure 6:
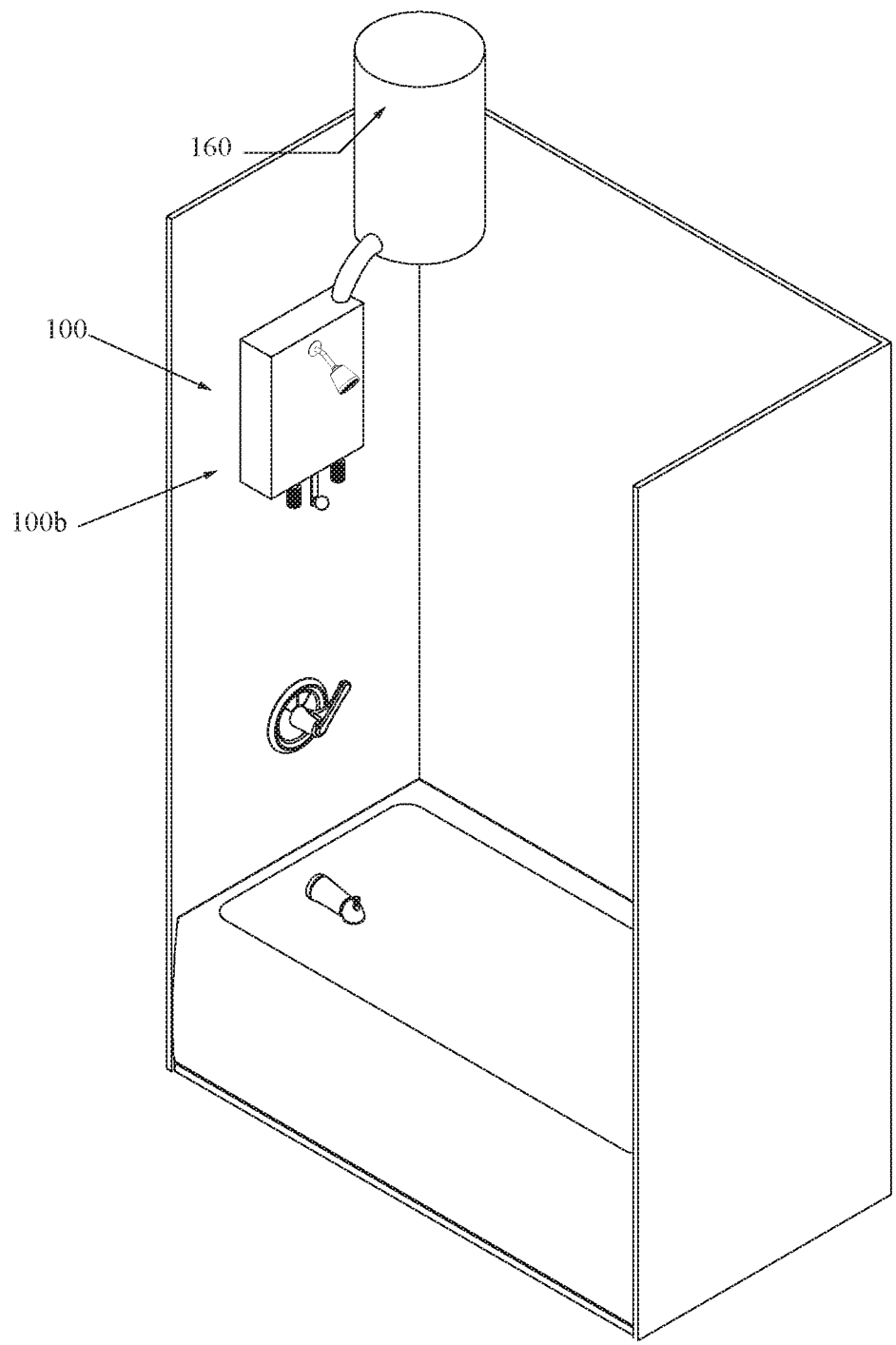
FIG. 6 shows an exemplary perspective view of one embodiment of the water diversion assembly configured to be used with an exemplary shower.

As shown in FIGS. 4-6, in some embodiments, the water collection outlet 155 is connected to a water reservoir 160 arranged above the appliance. The water reservoir 160 is configured to collect the water from the hot water supply prior to the hot water threshold temperature being reached. In some embodiments, the water reservoir 160 is housed in a fixed location when the water diversion assembly 100 is in the permanent configuration 100a. In other embodiments, the water reservoir 160 can be pressurized and is removable by the user and transported for a desired use at a different location.

Figure 7:
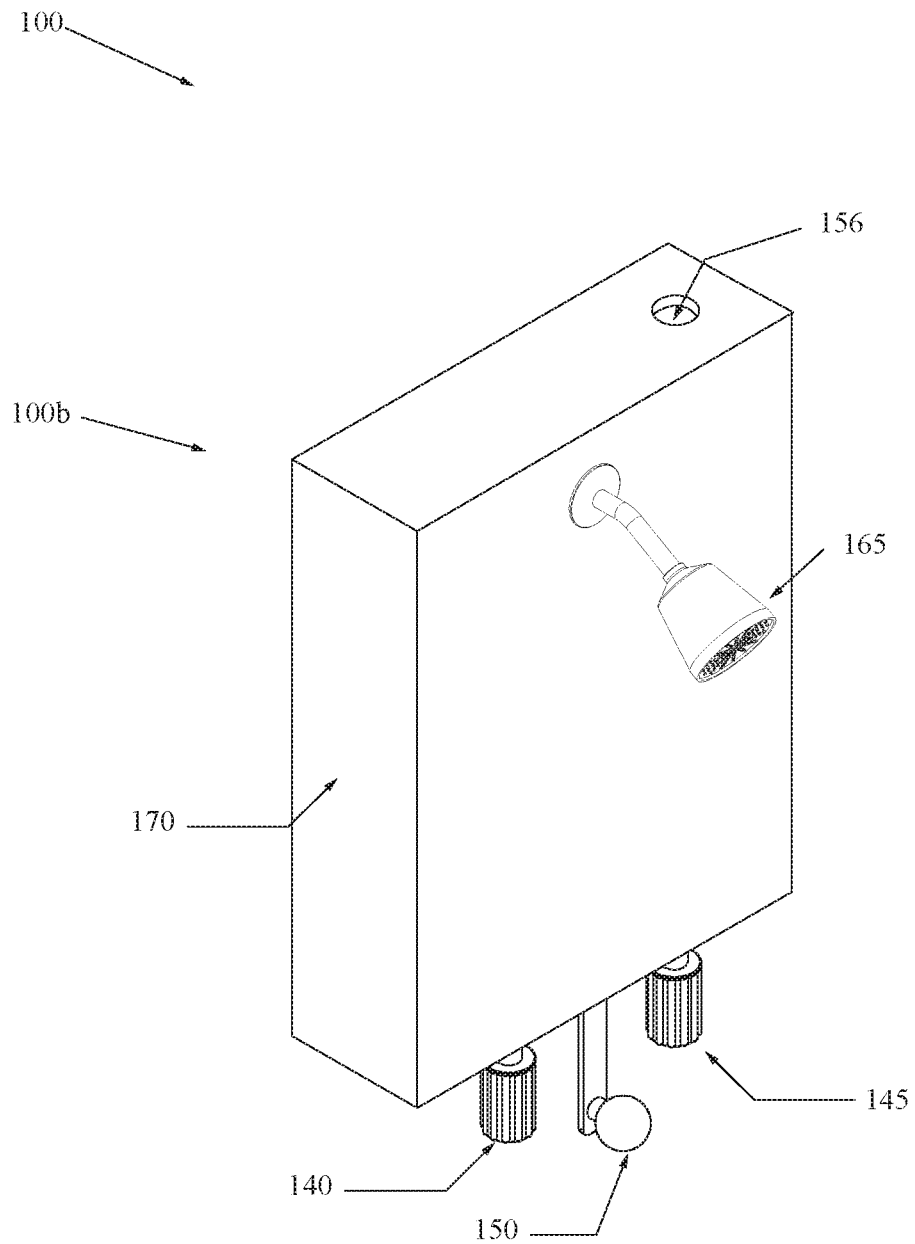
FIG. 7 shows an exemplary perspective view of one embodiment of the water diversion assembly.
Figure 8:
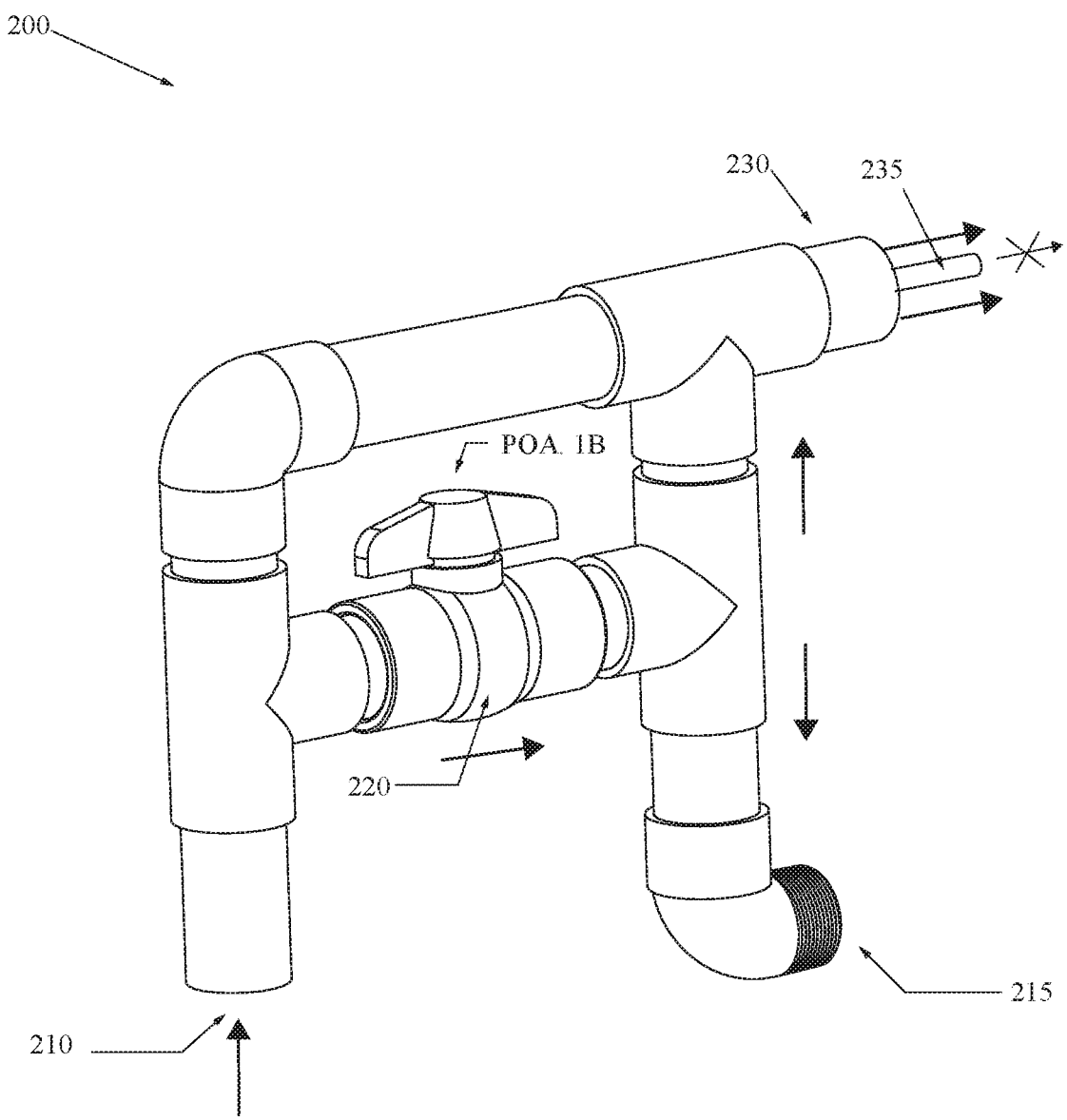
FIG. 8 shows an exemplary perspective view of one embodiment of the priming unit of the water diversion assembly.
Figure 9:
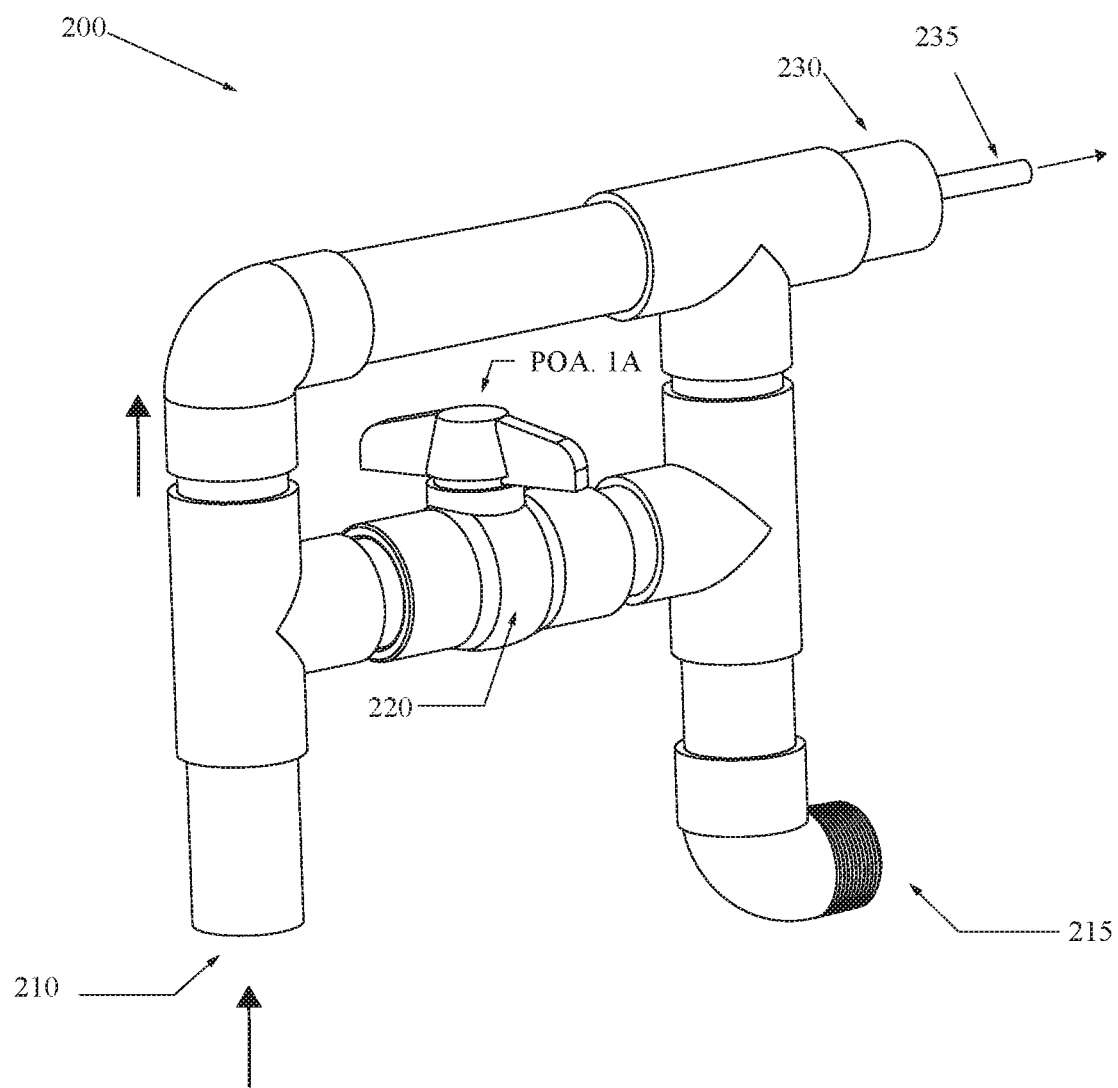
FIG. 9 shows an exemplary perspective view of one embodiment of the priming unit of the water diversion assembly.
Figure 10:
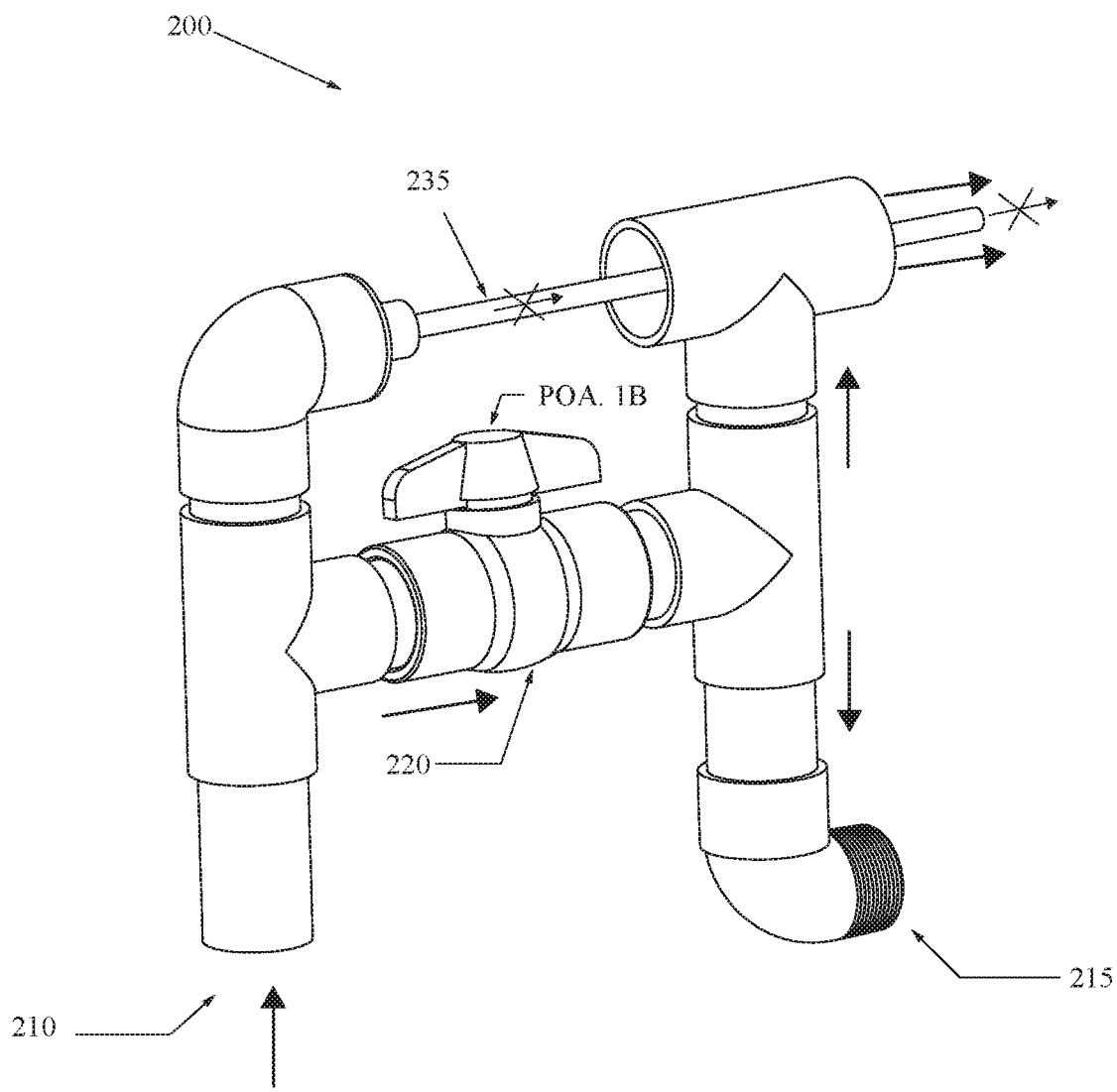
FIG. 10 shows an exemplary perspective view of one embodiment of the priming unit of the water diversion assembly.
Figure 11:
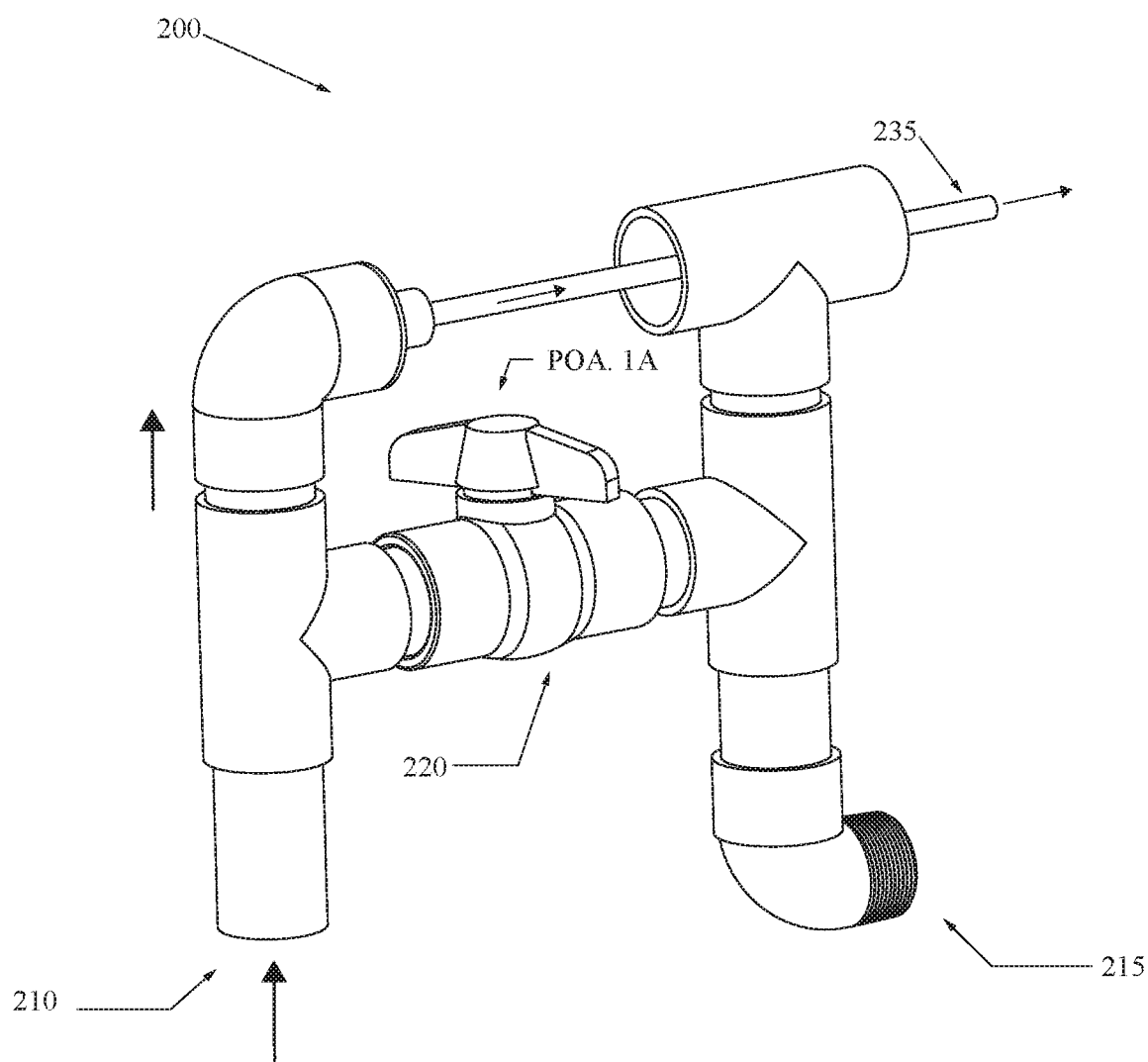
FIG. 11 shows an exemplary perspective view of one embodiment of the priming unit of the water diversion assembly.

As illustrated in FIG. 7, in some embodiments, the water diversion assembly 100 is in the modular configuration 110b, the water diversion assembly 100 may be housed within an enclosure 170 removably joined to a wall, a pipe, a building, or a structure. In other embodiments configured in the permanent configuration 100a, the water diversion assembly 100 may also include the enclosure 170 removably or permanently attached to a wall, a building, or a structure. In some embodiments, the enclosure 170 has at least one opening 156, wherein the first manual temperature control element 145, the second manual temperature control element 140, the third conduit 255, the fifth conduit 240, the appliance, the supply lever 150, and the shower head 165 may protrude through the at least one opening 156.

As illustrated in Figures in 8-12, in some embodiments, the water diversion assembly further comprises a priming unit 200 for the priming operation. The priming unit 200 in fluid connection with the first conduit 235, the fourth conduit 230, the toilet water supply line 210, and the toilet tank supply line 215. The priming unit 200 can be manually engaged by the user to prime the fourth conduit 230 by engaging a primer valve 220 to POS.1B. In the preferred embodiment, under normal operation, the primer valve 220 rests in POS.1A wherein the cold water supply of the toilet water supply line 210 is forcibly directed through the first conduit 235, the second conduit 245 to the float water level control valve within the water reservoir 160 and finally though the third conduit 255 to the cold water inlet 105 of the water diversion assembly 100. In doing so, the priming operation allows for the water reservoir 160 downstream of the water collection outlet 155 to be utilized by the appliances by re-filling a fourth conduit 230 to re-initiate the siphon within the fourth conduit 230.

Components and the at least one conduit of the water diversion assembly 100 may be assembled via an attachment set consisting of: a weld, at least one fastener, an adhesive, at least one threaded surface, a chemical bonding process, a press fit, a clamp, a spring, and other attachment sets known in the art. In some embodiments, the water diversion assembly 100 includes a water meter positioned downstream of the thermostatic diverting valve and in line with the water collection outlet 155 to monitor a volume of water delivered to the water reservoir 160 or the appliance from the water diversion assembly 100. The water meter also records the amount of water diverted, or saved by using the present invention.

In some embodiments, the water diversion assembly 100 is made of at least one material of a material set, by way of non-limiting example consisting of: a metal material, a composite material, a ceramic material, a cast iron material, a stainless steel material, a fiberglass material, a carbon fiber material, and a plastic material. Each point of connection of the water diversion assembly 100 may further include at least one seal. Wherein the at least one seal is constructed from a seal material set consisting of: a rubber material, a composite material, a rubber material, a non-rigid material, a foam material, a cork material, a silicone material, a fabric material, a neoprene material, a polytetrafluoroethylene material, and a plastic polymer material.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value setting, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

Unless otherwise defined, all technical terms used herein have the same meaning as commonly understood by one of ordinary skill in the art to which this disclosure belongs.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A water diversion assembly comprising:
    a hot water inlet configured to connect from a hot water supply;
    a cold water inlet configured to connect from a cold water supply;
    an appliance outlet configured to connect and deliver a water mix at an outlet temperature, wherein the appliance outlet is in fluid communication with the hot water inlet and the cold water inlet;
    a water collection outlet;
    a thermostatic diversion valve having a hot water threshold temperature, the thermostatic diversion valve arranged such that water from the hot water supply via the hot water inlet is delivered to the water collection outlet until the hot water threshold temperature is reached;
    a water reservoir in communication with the water collection outlet, wherein the water reservoir is configured to collect the water from the hot water supply prior to the hot water threshold temperature being reached;
    a first conduit in fluid communication with the cold water supply, a second conduit in fluid communication with the first conduit and the water reservoir, and a third conduit in fluid communication with the first conduit and the cold water inlet; and,
    a siphon positioned in the water reservoir and a fourth conduit in communication with the siphon.

2. The water diversion assembly of claim 1, further comprising a thermostatic mixing valve configured to automatically regulate the water mix such that the outlet temperature is at a predetermined temperature.

3. The water diversion assembly of claim 2, further comprising a second manual temperature control element configured to control the outlet temperature, wherein the second manual temperature control element is adjustable by a user.

4. The water diversion assembly of claim 1, further comprising a first manual temperature control element configured to control the hot water threshold temperature, wherein the first manual temperature control element is adjustable by a user.

5. The water diversion assembly of claim 1, further comprising a float water level control valve within the water reservoir and in fluid connection with the second conduit.

6. The water diversion assembly of claim 1, wherein the cold water supply is from a toilet water supply line and wherein the fourth conduit facilitates a fluid connection between the water reservoir and a toilet tank, such that the water from the water reservoir is used to fill the toilet tank after a toilet flush.

7. The water diversion assembly of claim 1, wherein the first conduit is positioned inside a portion of the fourth conduit.

8. The water diversion assembly of claim 1, further comprising a priming unit configured to prime the fourth conduit if a water level in the water reservoir falls below a predetermined level.

9. The water diversion assembly of claim 1, further comprising a water meter positioned to monitor a volume of water delivered to the water reservoir from the water collection outlet.

10. The water diversion assembly of claim 1, wherein the hot water supply is from a water heater.

11. The water diversion assembly of claim 1, wherein the water diversion assembly further comprises at least one check valve.

12. The water diversion assembly of claim 11, wherein the cold water inlet includes a check valve.

13. The water diversion assembly of claim 1, wherein the water diversion assembly is located within a wall.

14. The water diversion assembly of claim 1, further comprising at least one directional supply valve adjoined to at least one of the following: the hot water supply, the cold water supply, and the appliance outlet.

15. The water diversion assembly of claim 14, further comprising a manual supply lever configured to turn off or turn on the at least one directional supply valve.

* * * * *